(12) United States Patent
Peterson

(10) Patent No.: US 11,818,324 B2
(45) Date of Patent: Nov. 14, 2023

(54) VIRTUAL REALITY ENVIRONMENT

(71) Applicant: VEFXi Corporation, Georgetown, TX (US)

(72) Inventor: Craig Peterson, Georgetown, TX (US)

(73) Assignee: VEFXi Corporation, Georgetown, TX (US)

( * ) Notice: Subject to any disclaimer, the term of this patent is extended or adjusted under 35 U.S.C. 154(b) by 0 days.

(21) Appl. No.: 17/815,139

(22) Filed: Jul. 26, 2022

(65) Prior Publication Data

US 2022/0368878 A1 Nov. 17, 2022

Related U.S. Application Data

(63) Continuation of application No. 16/377,910, filed on Apr. 8, 2019, now abandoned.

(60) Provisional application No. 62/654,488, filed on Apr. 8, 2018.

(51) Int. Cl.
```
H04N 13/139      (2018.01)
G06F 3/01        (2006.01)
G06T 15/10       (2011.01)
H04N 13/366      (2018.01)
```

(52) U.S. Cl.
CPC ........... *H04N 13/139* (2018.05); *G06F 3/012* (2013.01); *G06T 15/10* (2013.01); *H04N 13/366* (2018.05); *G06T 2200/24* (2013.01); *G06T 2210/08* (2013.01)

(58) Field of Classification Search
CPC .... H04N 13/139; H04N 13/366; G06F 3/012; G06T 15/10; G06T 2200/24; G06T 2210/08
See application file for complete search history.

(56) References Cited

U.S. PATENT DOCUMENTS

| | | | | |
|---|---|---|---|---|
| 5,414,801 A * | 5/1995 | Smith | ...................... | G06T 15/10 345/157 |
| 5,971,589 A * | 10/1999 | Hazama | ................... | G06T 19/20 700/165 |
| 6,477,267 B1* | 11/2002 | Richards | ............... | H04N 13/239 348/E13.058 |
| 9,300,947 B2* | 3/2016 | Park | ...................... | H04N 13/211 |
| 2010/0080448 A1* | 4/2010 | Tam | ...................... | H04N 13/261 382/167 |
| 2015/0285654 A1* | 10/2015 | Kögler | ................. | G09B 29/106 701/409 |
| 2016/0323560 A1* | 11/2016 | Jin | ............................ | G06T 7/85 |
| 2017/0230641 A1* | 8/2017 | Scavezze | ............. | H04N 13/344 |
| 2018/0357747 A1* | 12/2018 | Young | ....................... | G06T 1/20 |

OTHER PUBLICATIONS

United States Patent and Trademark Office, International Search Report and Written Opinion for PCT App. No. PCT/US2019/026319 dated Jul. 18, 2019, 11 pages.
Bowman, 3D User Interface, 2004, https://people.cs.vt.edu/3dui_book/proofs/BOWMAN_ch04_PROOFED.pdf; 2004.

* cited by examiner

*Primary Examiner* — Xin Sheng
(74) *Attorney, Agent, or Firm* — Chernoff, Vilhauer, McClung & Stenzel, LLP

(57) ABSTRACT

A three-dimensional virtual reality environment.

20 Claims, 11 Drawing Sheets

VIRTUAL REALITY
HEADSET

SENSOR(S)
　GYROSCOPE
　ACCELLEROMETER

SPEAKER(S)

DISPLAY(S)

EYE TRACKING SENSOR(S)

FIG. 6

CONTROL VECTOR BINDINGS

| HEADSET MOTION | SCALE FACTOR (e.g., program specific) | MAX | MIN |
|---|---|---|---|
| TURN RIGHT | 80 | 95 | 20 |
| TURN LEFT | 80 | 95 | 25 |
| LOOK UPWARD | 75 | 90 | 15 |
| LOOK DOWNWARD | 100 | 90 | 15 |
| MOVE FORWARD | 15 | 80 | 5 |
| MOVE BACKWARD | 15 | 80 | 5 |
| CROUCH | 20 | 95 | 10 |
| JUMP | 15 | 95 | 10 |
| DEFAULT / OTHERS | | | |

FIG. 9

VIRTUAL REALITY ENVIRONMENT

CROSS-REFERENCE TO RELATED APPLICATIONS

This application is a continuation of U.S. patent application Ser. No. 16/377,910, filed Apr. 8, 2019, which claims the benefit of U.S. Provisional Patent Application No. 62/654,488, filed Apr. 8, 2018, entitled Virtual Reality Environment.

BACKGROUND OF THE INVENTION

Referring to FIG. 1, a computer 22 often includes a microprocessor, a memory, a storage device (e.g., hard drive or solid state memory), a graphics processor that is coupled to an external display 18, such as a liquid crystal display. The computer 22 often includes input devices such as a mouse 16 and a keyboard 20. The computer 22 typically includes an operating system, such as Microsoft Windows or MAC OS, that supports the operation of other application programs, such as word processors, spreadsheets, and computer games.

The foregoing and other objectives, features, and advantages of the invention may be more readily understood upon consideration of the following detailed description of the invention, taken in conjunction with the accompanying drawings.

BRIEF DESCRIPTION OF THE SEVERAL VIEWS OF THE DRAWINGS

FIG. 6 illustrates a virtual reality headset that may include sensor(s), speakers(s), display(s), and/or eye tracking sensor(s).

FIG. 9 illustrates control vector binding scaling.

DETAILED DESCRIPTION OF PREFERRED EMBODIMENT

Figure 1:
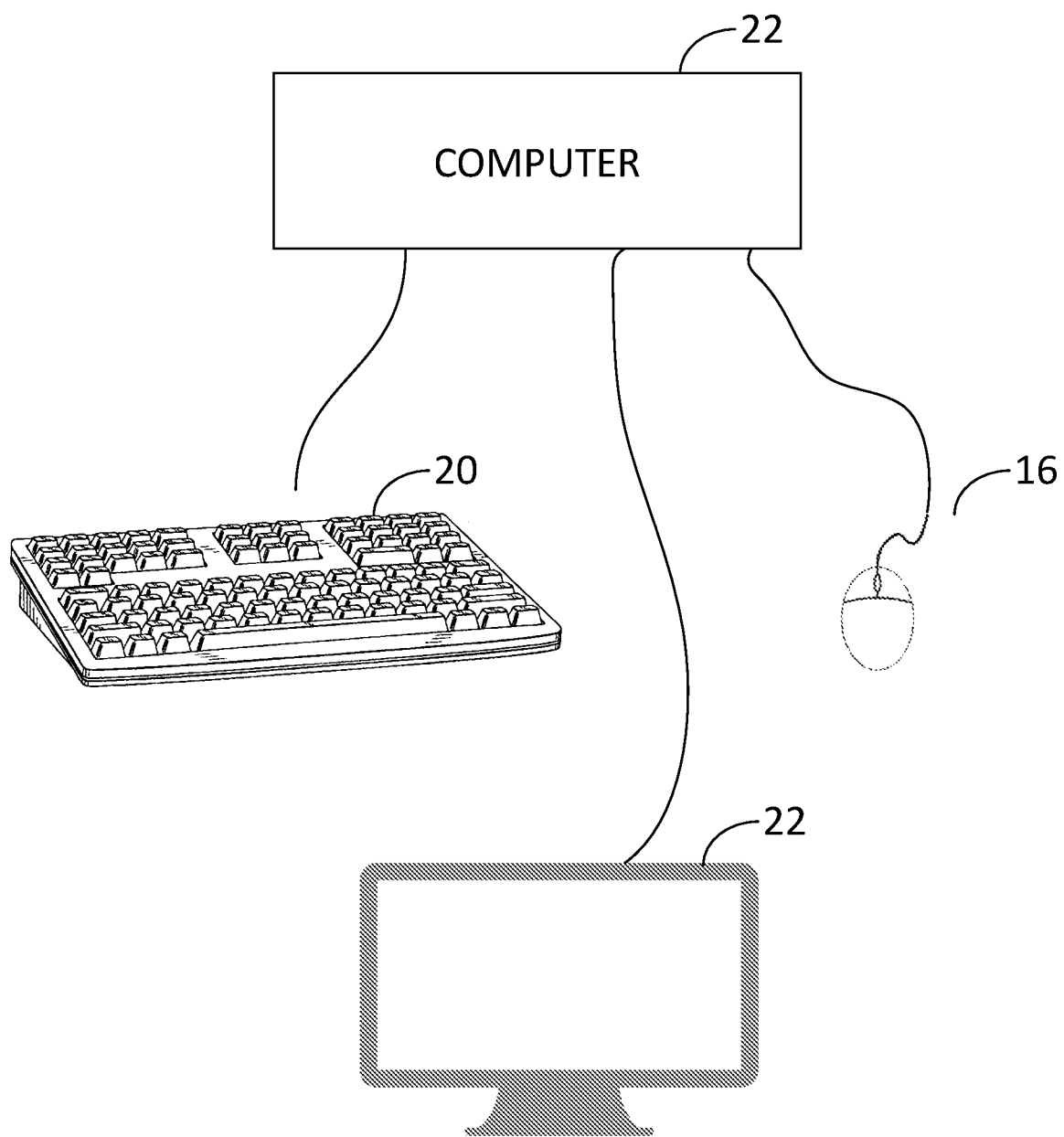
FIG. 1 illustrates a computer with a two-dimensional display.
Figure 2:
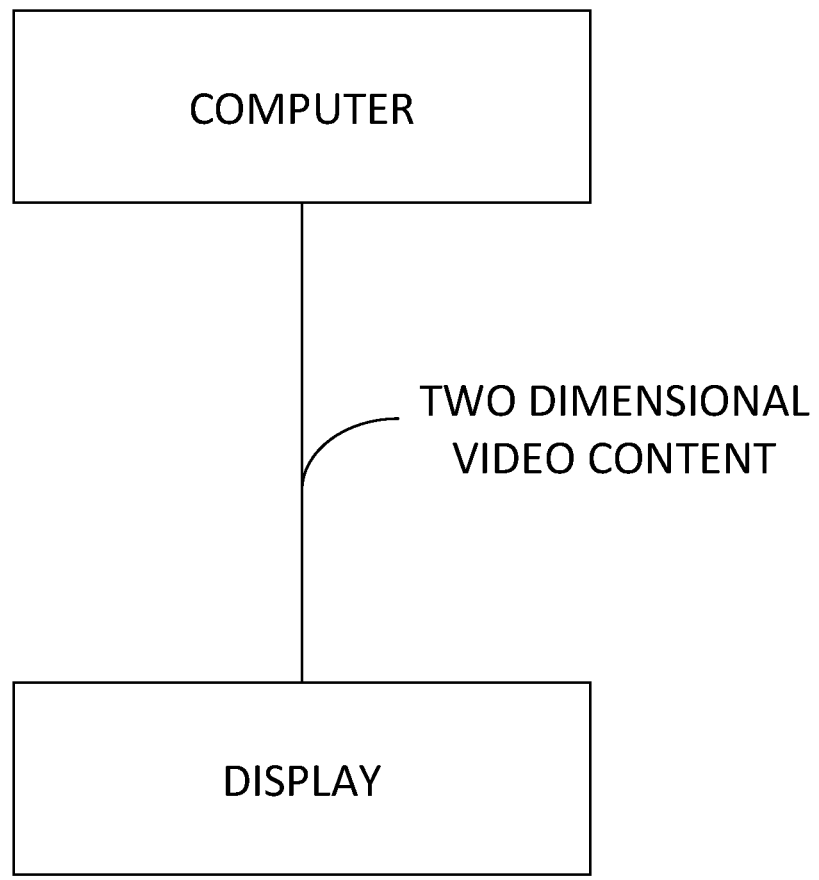
FIG. 2 illustrates a computer providing a two-dimensional video signal to a two-dimensional display.

Referring to FIG. 2, the computer, often in the environment of computer games, provides a two-dimensional video signal having HD, 4K UHD, 5K UHD, and even sometimes 8K UHD resolution, to the display. The interconnection between the computer and the display, depending on the particular technology has limited bandwidth. By way of example, some computers are only capable of transmitting and/or some displays are only capable of receiving HD or less. By way of example, some computers are only capable of transmitting and/or some displays are only capable of receiving 4K UHD or less. By way of example, some computers are only capable of transmitting and/or some displays are only capable of receiving 5K UHD or less. By way of example, some computers are only capable of transmitting and/or some displays are only capable of receiving 8K UHD or less. In addition, often the particular type of interconnection technology, DisplayPort cables, HDMI cables, DVI cables, USB-C cables, etc., limit the bandwidth of video that may be transmitted between the computer and the display.

Figure 3:
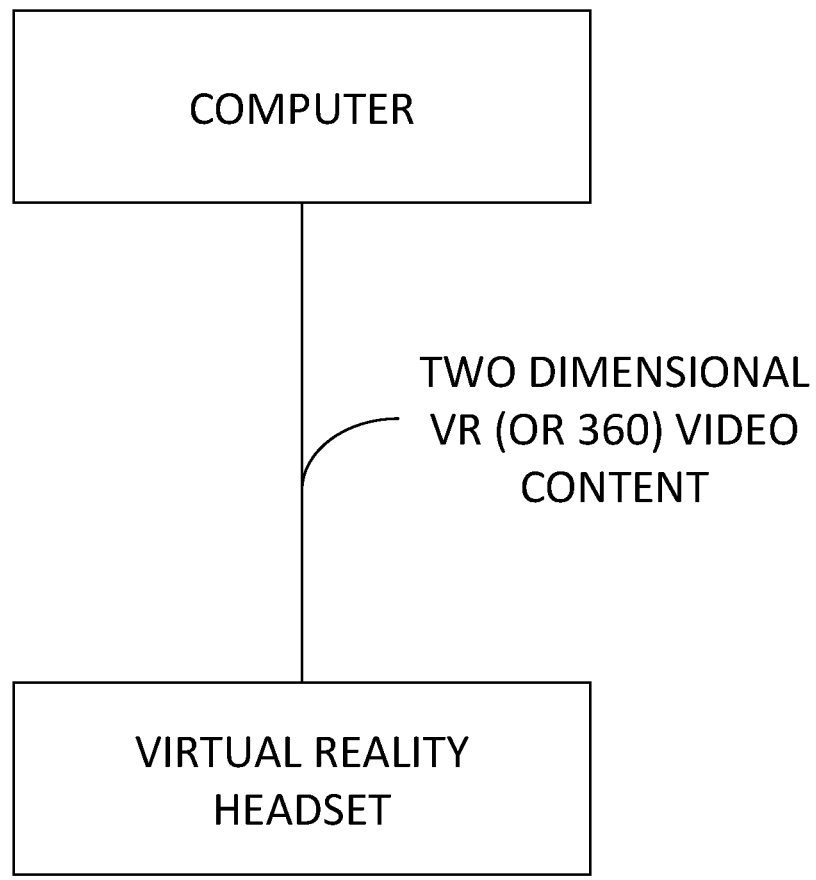
FIG. 3 illustrates a computer providing a two-dimensional video signal to a virtual reality headset with the same two-dimensional image presented on a respective display for each eye.

Referring to FIG. 3, the computer, often in the environment of computer games, provides a two-dimensional video signal having 2.5K which is 2560×1440, 4K UHD, and over 4K UHD for each eye, to a virtual reality headset. The interconnection between the computer and the virtual reality headset, depending on the particular technology has limited bandwidth. By way of example, some computers are only capable of transmitting and/or some virtual reality headsets are only capable of receiving 2K UHD or less. By way of example, some computers are only capable of transmitting and/or some virtual reality headsets are only capable of receiving 4K UHD or less. By way of example, some computers are only capable of transmitting and/or some virtual reality headsets are only capable of receiving 5K UHD or less. By way of example, some computers are only capable of transmitting and/or some virtual reality headsets are only capable of receiving 8K UHD or less. In addition, often the particular type of interconnection technology, DisplayPort cables, HDMI cables, DVI cables, USB-C cables, etc., limit the bandwidth of video that may be transmitted between the computer and the virtual reality headset. The content provided by the computer is two-dimensional virtual reality content or two-dimensional 360 virtual reality content, and the content rendered on the virtual reality headset is likewise two-dimensional content.

Two-dimensional video content, such as obtained with a video camera having a single aperture, is often either projected onto a display screen for viewing or viewed on a display designed for presenting two-dimensional content. Over time, the resolution of displays has tended to increase, from standard television interlaced content resolution (e.g., 480i), to high definition television content (e.g., 1080i), to 4K definition television content (4K UHD), and even to even higher definition television content (e.g., 8K UHD). Such increases in video resolution technology only provide for limited increases in the apparent image quality to the viewer. Accordingly, the viewer is only immersed in the video experience to a limited extent.

To increase the immersive experience of the viewer it is often desirable to view three-dimensional image content. The perception of three-dimensional content may involve a third dimension of depth, which may be perceived in a form of binocular disparity by the human visual system. Since the left and the right eyes of the viewer are at different positions, each perceives a slightly different view of a field of view. The human brain may then reconstruct the depth information from these different views to perceive a three-dimensional view. To emulate this phenomenon, a three-dimensional display may display two or more slightly different images of each scene in a manner that presents each of the views to a different eye of the viewer. A variety of different display technologies may be used, such as for example, anaglyph three-dimensional system, polarized three-dimensional system, active shutter three-dimensional system, head mounted stereoscopic display system, and auto stereoscopic display system.

Figure 4:
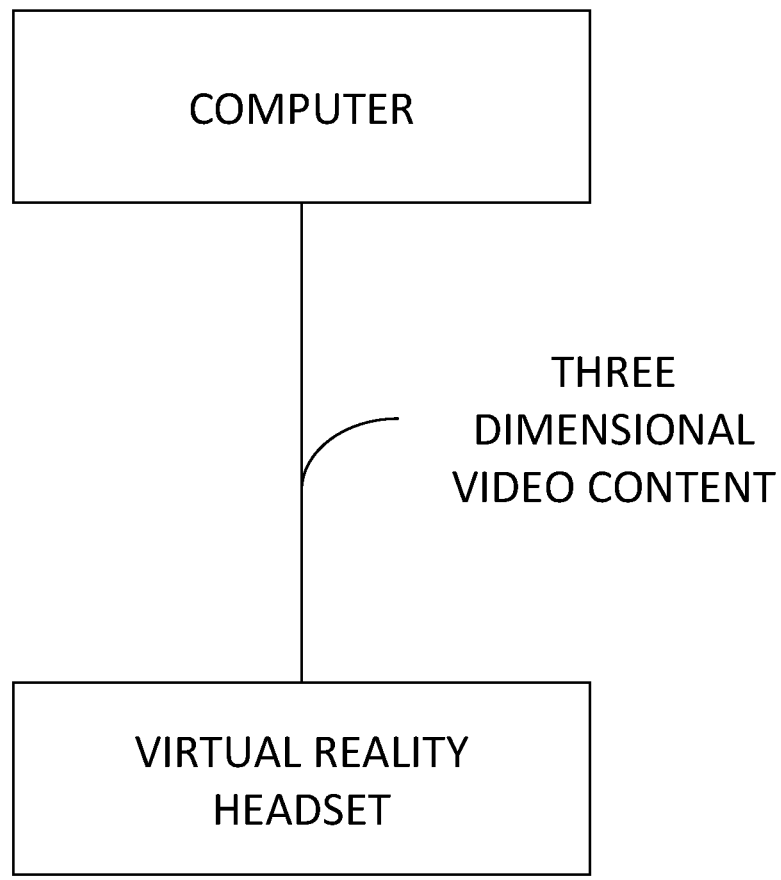
FIG. 4 illustrates a computer providing a three-dimensional video signal to a virtual reality headset with different two-dimensional images presented on a respective display for each eye.

Referring to FIG. 4, the computer, often in the environment of computer three-dimensional games, provides a three-dimensional video signal having 880×1600 (1400× 1600 per eye) or 2160×1200 (1080×1200 per eye), to a virtual reality headset. The interconnection between the computer and the virtual reality headset, depending on the particular technology has limited bandwidth. While the computer may have relatively high three-dimensional video content, due to rendering limitations the virtual reality headset only receives a portion of the overall available video content, such as $\frac{1}{8}^{th}$ of the three-dimensional view. By way of example, a virtual reality headset typically has about a 90 degree field of view in a horizontal and vertical direction. By way of example, the $\frac{1}{8}^{th}$ may be viewed when the virtual reality is two-dimensional, with ¼ of the 360 degrees horizontally and ½ of the 180 degrees vertically. By way of example, $\frac{1}{16}^{th}$ may be viewed when the virtual reality is three-dimensional because the frames are split in half vertically for the left eye and the right eye. In this manner, the user of the virtual reality headset needs to adjust their view substantially in order to view the entire 4K UHD view, a portion at a time, that would have otherwise been available on a traditional display. By way of example, rather than rendering a game as 4K UHD or 5K UHD that a conventional computer game renders as two-dimensional on a two-dimensional monitor, the virtual reality headset generally displays as approximately standard definition equivalent number of pixels, or less (e.g., generally $\frac{1}{8}^{th}$ or $\frac{1}{16}^{th}$ of 4K UHD). Moreover, the rendered three-dimensional content may be of somewhat insufficient quality due to the rendering limitations and the three-dimensional content being provided to the virtual reality headset.

As three-dimensional display systems become more readily prevalent the desire for suitable three-dimensional content to present on such displays increases. One way to generate three-dimensional content is using three-dimensional computer-generated graphics. While such content is suitable for being displayed, the amount of desirable such three-dimensional computer-generated content is limited. Another way to generate the dimensional content is using three-dimensional video camera systems. Likewise, while such video camera content is suitable for being displayed, the amount of desirable such three-dimensional content is likewise limited. A preferable technique to generate three-dimensional content is using the vast amounts of available two-dimensional content, especially the decades of single-view high-resolution two-dimensional content available from computer games, and converting the two-dimensional content into three-dimensional content.

One technique to achieve single-view two-dimensional (2D) to three-dimensional (3D) conversion is using a modified time difference technique. The modified time difference technique converts 2D images to 3D images by selecting images that would be a stereo-pair according to the detected motions of objects in the input sequential images. This technique may, if desired, be based upon motion vector information available in the video or otherwise determined.

Another technique to achieve two-dimensional (2D) to three-dimensional (3D) conversion is using a computed image depth technique. The 3D images are generated based upon the depth inferred characteristics of each 2D image. The characteristics of the image that may be used, include for example, the contrast of different regions of the image, the sharpness of different regions of the image, and the chrominance of different regions of the image. The sharpness, contrast, and chrominance values of each area of the input image may be determined. The sharpness relates to the high frequency content of the luminance signal of the input image. The contrast relates to a medium frequency content of the luminance signal of the input image. The chrominance relates the hue and the tone content of the color signal of the input image. Adjacent areas that have close color may be grouped together according to their chrominance values. The image depth may be computed using these characteristics and/or other characteristics, as desired. For example, generally near positioned objects have higher sharpness and higher contrast than far positioned objects and the background image. Thus, the sharpness and contrast may be inversely proportional to the distance. These values may likewise be weighted based upon their spatial location within the image. Other techniques may likewise be used to achieve a 2D to 3D conversion of an input image, including motion compensation, if desired.

Figure 5:
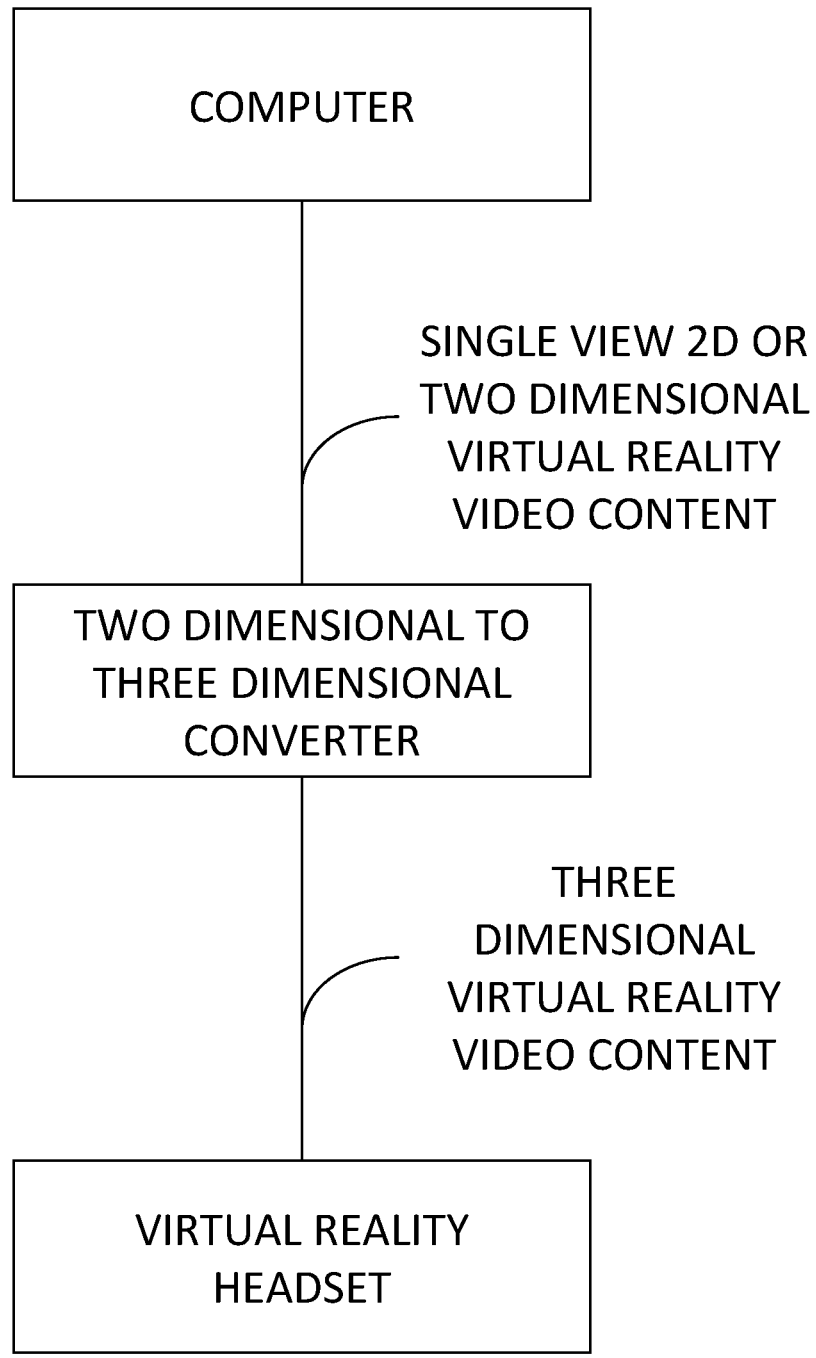
FIG. 5 illustrates a computer providing a two-dimensional video signal to a 2D-3D converter that provides a three-dimensional video signal to a virtual reality headset.

Referring to FIG. 5, the computer, often in the environment of conventional computer games, often provides a two-dimensional video signal having HD or 2.5K to a rendering device Accordingly, from the viewpoint of the computer, the output has a single view two-dimensional video signal. Preferably, the video signal has a 4K UHD, 2.5K, 5K UHD, 8K UHD, or more, resolution that is especially suitable for a high-resolution rendering. The two-dimensional video signal is preferably carried by a transmission cable, such as a HDMI cable, a DVI cable, a DisplayPort cable, or a USB-C cable. The transmission cable is interconnected to a two-dimensional to three-dimensional virtual reality video converter. The output of the two-dimensional to three-dimensional video converter is a three-dimensional virtual reality video signal. Accordingly, from the viewpoint of the two-dimensional to three-dimensional video converter, the output has a three-dimensional virtual reality video signal. Preferably, the video signal has a HD, 2.5K, 4K UHD, or more, resolution that is especially suitable for a high-resolution three-dimensional rendering. The three-dimensional video signal is provided to a three-dimensional enabled virtual reality headset suitable to be worn by the head of a user. Accordingly, from the viewpoint of virtual reality headset, the input has a three-dimensional video signal that was provided from the computer system. In this manner, the computer provides a two-dimensional video signal that would traditionally be provided to a two-dimensional display, typically using a high-resolution video format. In this manner, the virtual reality headset receives a three-dimensional video signal, typically as a high-resolution video format. In this manner, the two-dimensional video signal is rendered as a three-dimensional virtual reality video signal, without either the computer or the virtual reality headset being aware of the other's two-dimensional or three-dimensional video capabilities. Thus, the computer and converter can output a much higher resolution virtual reality three-dimensional video signal than possible with a frame based virtual reality video signal. The virtual reality headset can receive a high-resolution three-dimensional video input, which is not typical for high end virtual reality video games which at most provide relatively low-resolution three-dimensional video, such as $\frac{1}{16}^{th}$ of the pixels in a 4K virtual reality frame.

As it may be observed, there is not typically bandwidth limitations in the cabling, but rather, that conventional virtual reality is limited to only being able to display that portion of a 360 4K frame that is in front of the viewer. This limitation is a result of conventional virtual reality that includes all of the 360 video around the viewer in one 4K frame. In contrast, a conventional computer or a game console only renders that which is in front of the viewer, which is often at 4K or greater resolution. While the computer may have relatively high three-dimensional video content, due to rendering limitations the virtual reality headset only displays a portion of the overall available 4K frame based virtual reality video content, such as $\frac{1}{8}^{th}$ or $\frac{1}{16}^{th}$ of the three-dimensional frame. In this manner, the user of the virtual reality headset when directly receiving three-dimensional image content from a computing device needs to adjust their view substantially in order to view the entire 4K UHD view, a portion at a time, that would have otherwise been available when receiving similar two-dimensional image content on a traditional two-dimensional display. By way of example, rather than rendering a game as 4K UHD or 5K UHD, the virtual reality headset generally displays as standard definition equivalent number of pixels, or less (e.g., generally $\frac{1}{8}^{th}$ or $\frac{1}{16}^{th}$ of 4K UHD). Moreover, the rendered three-dimensional content may be of somewhat insufficient quality due to the rendering limitations and the three-dimensional content being provided to the virtual reality headset. By way of example, for a 4K UHD linear two-dimensional output from the computer, after conversion from 2D to 3D, the input to the virtual reality headset may be a pair of 4K images, thus being generally equivalent to receiving 8K UHD content. Furthermore, preferably the view illustrated in the two-dimensional image output is the same or substantially the same (within 10 percent) in the view of the three-dimensional image being rendered in the virtual reality headset. In this manner, the typical wide expansive view that would have been rendered on a display, such as a desktop liquid crystal monitor, is substantially the same view that is rendered on the virtual reality headset which increases the immersive experience of the viewer.

Typically, computer applications that are designed to output a two-dimensional video output to a display include a user interface that is based upon the user interfacing with an interface device, such as a computer keyboard and/or a game controller and/or a mouse. By way of example, the mouse is moved to the right the view is moved to the right, the mouse is moved to the left the view is moved to the left, the mouse is moved up the view is moved up, and the mouse is moved down the view is moved down. In this manner, the viewer can control the view observed on the display using the interface device. However, with a virtual reality headset covering the eyes of the user it is problematic for the user to effectively use the interface device to control the view observed on the display.

Referring to FIG. 6, the virtual reality headset may include one or more sensors for tracking motion such as gyroscope sensors, accelerometer sensors, may include one or more speakers for mono or stereo sound, may provide a separate image for each eye with one or more displays, and may include one or more eye tracking sensors. The three-dimensional input video provides data to display the three-dimensional content on the display(s) and provide audio to the speaker(s) for the virtual reality headset. Movement of the virtual reality headset, as sensed by the sensor(s) (which may be the eye tracking sensor(s)) can provide output signals indicating the movement of the virtual reality headset.

Figure 7:
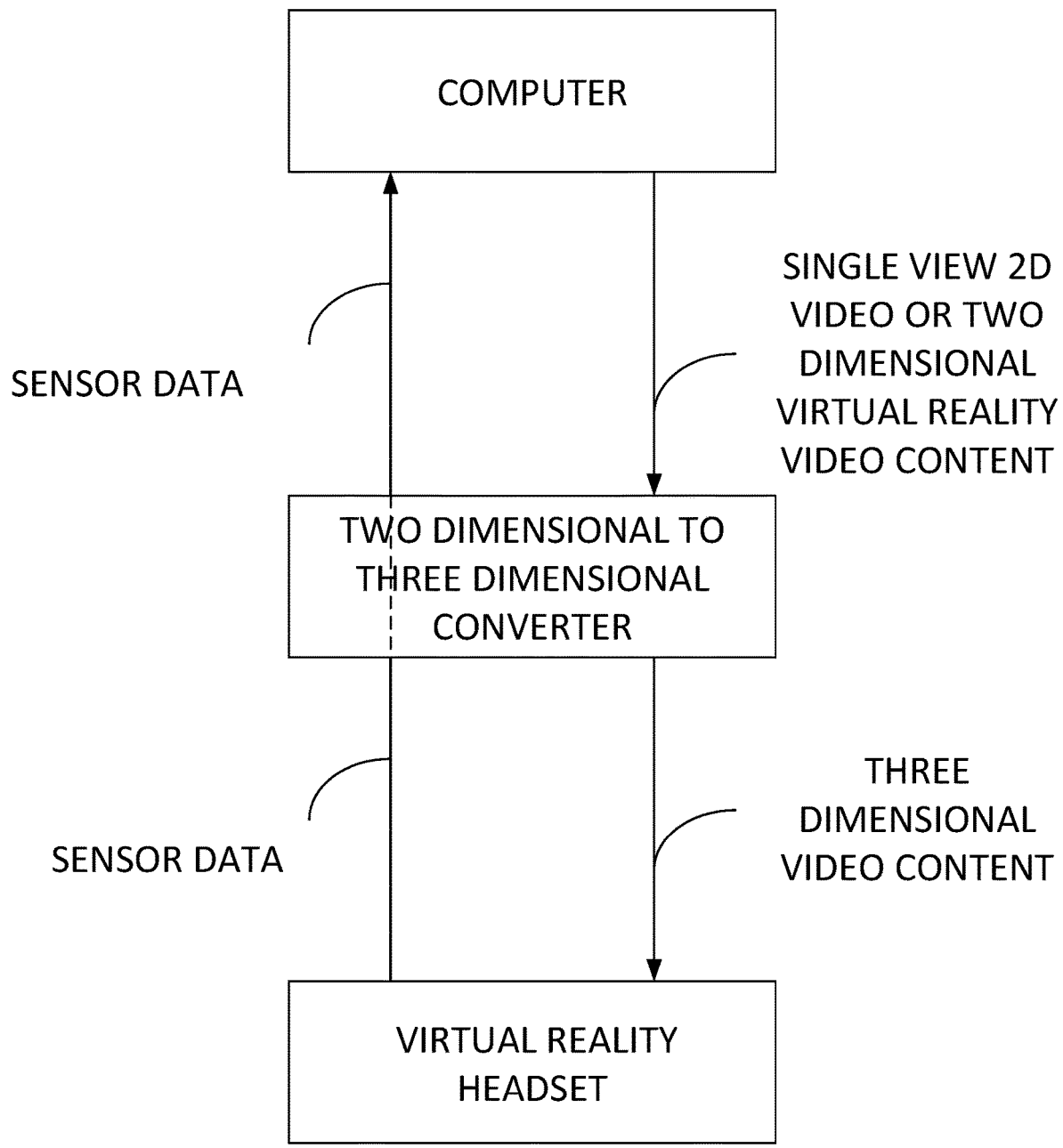
FIG. 7 illustrates a computer providing a two-dimensional video signal to a 2D-3D converter that provides a three-dimensional video signal to a virtual reality headset that provides sensor data to the 2D-3D converter that provides the sensor data to the computer or otherwise provides sensor data directly to the computer.

Referring to FIG. 7, the virtual reality headset may provide sensor-based data, through the two-dimensional to three-dimensional converter, to the computer regarding its movement. The virtual reality headset may provide sensor-based data directly (or otherwise) to the computer regarding its movement, such as by a USB connection or other cable. The computer may include a human interface device (e.g., drivers and/or software) that receives the input from the virtual reality headset in such a manner that it appears to be a standard controlling device, such as a mouse, a keyboard, or a game controller. For example, the data may be provided over any suitable transport, such as HID over I2C or HID over USB. In this manner, when the headset turns to the right the computer will receive data indicating the viewer turned to the right and modify the output view accordingly. In this manner, when the headset turns to the left the computer will receive data indicating the viewer turned to the left and modify the output view accordingly. In this manner, when the headset turns upward the computer will receive data indicating the viewer turned upward and modify the output view accordingly. In this manner, when the headset turns downward the computer will receive data indicating the viewer turned downward and modify the output view accordingly. Thus, the virtual reality headset is bound to the computer for communications. Accordingly, the user can modify the view that is observed simply by moving the headset (or eye gaze for eye tracking), which is suitable when the eyes of the viewer can not readily observe a mouse, keyboard, or game controller.

In another embodiment, the sensor data does not pass through the two-dimensional to three-dimensional converter. The sensor data may be interconnected from the two-dimensional to three-dimensional converter to the computer using a different cable, or otherwise the same cable(s) with the sensor data is routed such that it doesn't pass through the conversion aspects of the two-dimensional to three-dimensional converter. Preferably, the headset motion controls (e.g., sensor data) are converted to HID commands (e.g., data) by software running on the computer.

In another embodiment, the computer may be a computer gaming console, such as an XBOX 360 or a PlayStation. In another embodiment, the computer may be a mobile phone that includes a three-dimensional display, with the two-dimensional to three-dimensional conversion occurring within the mobile phone, where the mobile phone is part of a virtual reality headset and in particular provides the display for the headset. In this embodiment, the mobile device would also include the application that plays a standalone and/or network-based game.

As it may be observed, the computer provides a single view two-dimensional video signal that would traditionally be provided to a two-dimensional display monitor, typically using a high-resolution video format, while the virtual reality headset receives a three-dimensional video signal, typically as a high-resolution video format. Further as it may be observed, the virtual reality headset, or otherwise other hardware and/or software associated with the virtual reality headset, provides responsive data to the computer in a manner that the computer would otherwise expect, such as a mouse, a keyboard, or a game controller, to control the movement of the images displayed on the virtual reality headset. Moreover, the computer is unaware that the content is being viewed on a virtual reality headset, as the two-dimensional to three-dimensional converter appears to the computer as an anticipated two-dimensional rendering display, and the data provided from the virtual reality headset appears as an anticipated interface device.

In this manner, the two-dimensional video signal is rendered as a three-dimensional video signal, without either the computer or the virtual reality headset being aware of the other's two-dimensional or three-dimensional video capabilities. Thus, the computer can output a high-resolution two-dimensional video signal, which is typical for high end video games, and the virtual reality headset can receive a high-resolution three-dimensional video input, which is not typical for high end video games which at most provide relatively low-resolution three-dimensional video. Moreover as it may be observed, that video data from the computer is two-dimensional video content which is relatively lower bandwidth compared to the corresponding three-dimensional video content which is relatively higher bandwidth or the same bandwidth, and accordingly the computer only need the capability of providing the relatively lower bandwidth two-dimensional video. Moreover, as it may be observed, there is no need to cache a plurality of frames of three-dimensional video content for the virtual reality headset because it is converted 'on the fly' from the two-dimensional video content.

Figure 8:
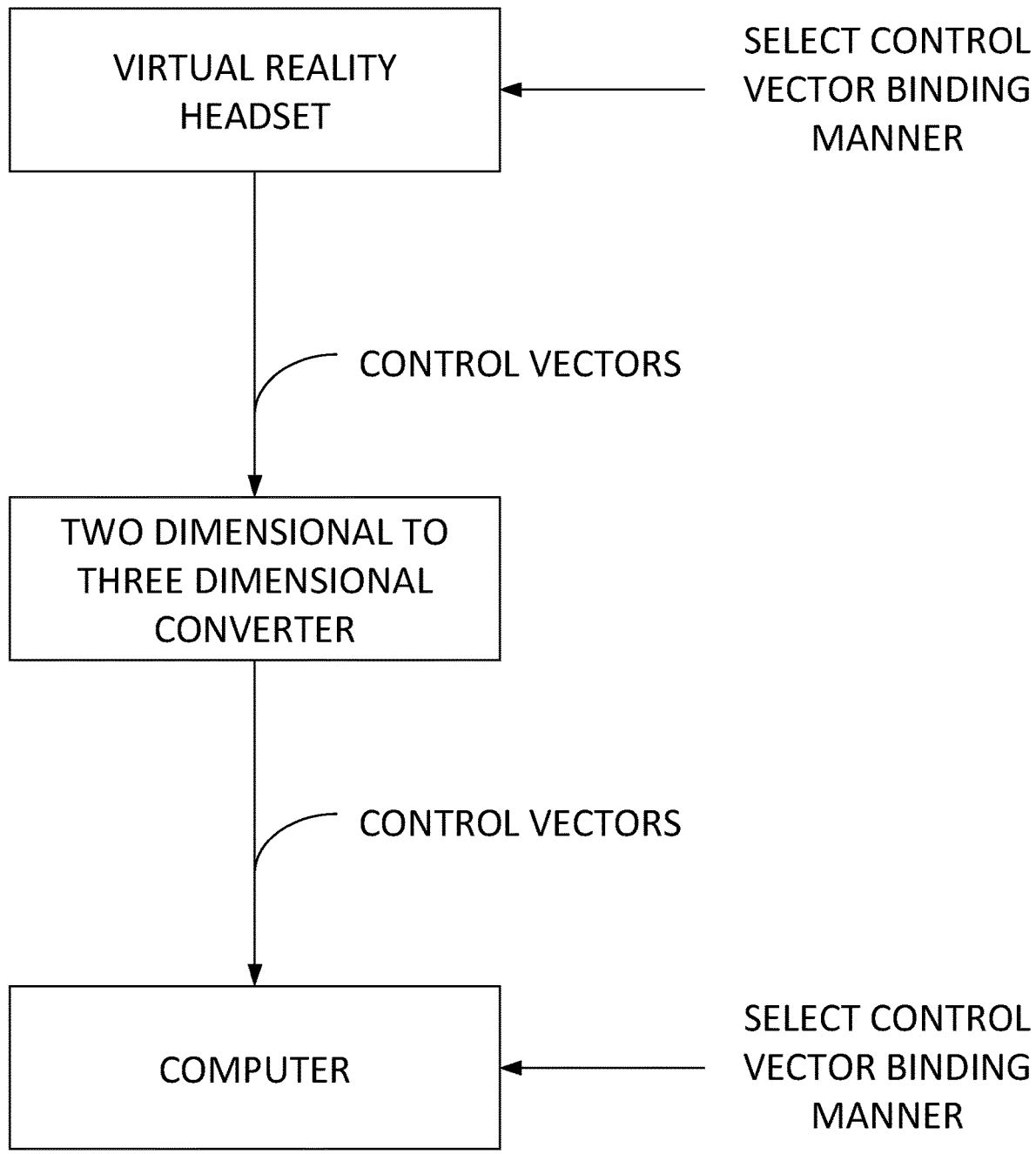
FIG. 8 illustrates a computer providing a two-dimensional video signal to a 2D-3D converter that provides a three-dimensional video signal to a virtual reality headset, together with selecting control vector binding.

Referring to FIG. 8, the binding of the virtual reality headset may be performed in a manner consistent with the particular application it is being used for. The different vectors, such as for example, position, motion, turning left and right, turning upward and downward, acceleration, etc., from the virtual reality headset, or otherwise other hardware and/or software associated with the virtual reality headset, may be mapped (e.g., bindings) in a different manner by the computer depending on the context. By way of example, for a medical application the virtual reality headset may include a first set of bindings which map vectors from the virtual reality headset to a traditional interface device in a first manner. By way of example, for a first-person shooter game the virtual reality headset may include a second set of bindings which map vectors from the virtual reality headset to a traditional interface device in a second manner, different from the first manner. For example, the first manner may be consistent with a computer mouse. For example, the second manner may be consistent with a game controller. For example, a third manner may be consistent with particular keys of a keyboard. The particular binding may be selected automatically in some manner based upon the particular application being used. The particular binding may be selected on the virtual reality headset in some manner, such as setting made through the display on the virtual reality headset. In this manner, the user may select the desired manner of binding without regard to the computer. The particular binding may be selected on the computer in some manner, such as setting made through the computer for the particular application being used. In this manner, the user may select the desired manner of binding without regard to the virtual reality headset.

Referring to FIG. 9, the manner of binding may further include one or more different scaling factors, which may be selectable by the user. The scale factor may be program specific, if desired. The scale factor may also include a maximum and a minimum, if desired, which may be further program specific, if desired. The user may enter the scaling for each of the movements of the virtual reality headset. In some cases, the user may prefer a small movement of the head resulting in a substantial movement of the view being observed. In other cases, the user may prefer a large movement of the head resulting in an insubstantial movement of the view being observed. In many cases, the scaling may be used to compensate for different games (or other software) having different sensitivities (e.g., mouse, joystick, keys, and/or trackball). For example, "turn right" may be as a result of moving the mouse right, "turn left" may be as a result of moving the mouse left, "look upward" may be as a result of mouse up, "look downward" may be as a result of mouse down, etc. For example, a set of keys may be used for the motion controls, such as A, B, C, D, →, ↓, ↑, ←.

Figure 10:
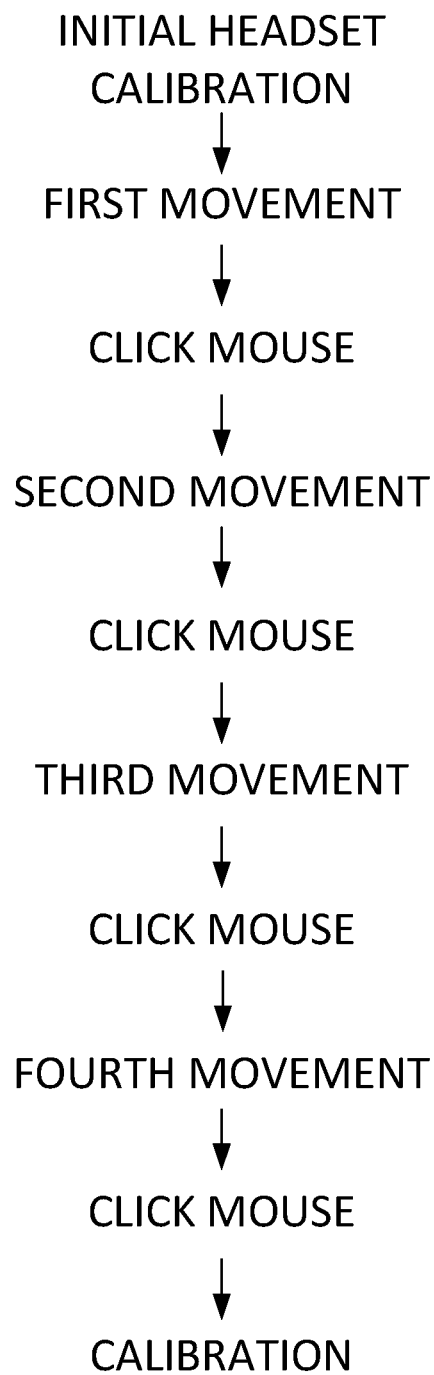
FIG. 10 illustrates a headset calibration technique.

Referring to FIG. 10, another manner of binding may include an interactive technique. The user may initiate calibration of the virtual reality headset. The user may make a first movement, such as turn left 90 degrees as indicated on the display or audibly, and then indicate the movement has been made, such as by clicking a mouse. The user may make a second movement, such as turn right 90 degrees as indicated on the display or audibly, and then indicate the movement has been made, such as by clicking a mouse. The user may make a third movement, such as turn upward 90 degrees as indicated on the display or audibly, and then indicate the movement has been made, such as by clicking a mouse. The user may make a fourth movement, such as turn downward 90 degrees as indicated on the display or audibly, and then indicate the movement has been made, such as by clicking a mouse. Other calibrations may likewise be made. The result is a set of calibration data suitable for being used particularized to the user and/or the particular application. A similar technique may involve the use of one or more key presses to achieve a calibration.

Figure 11:
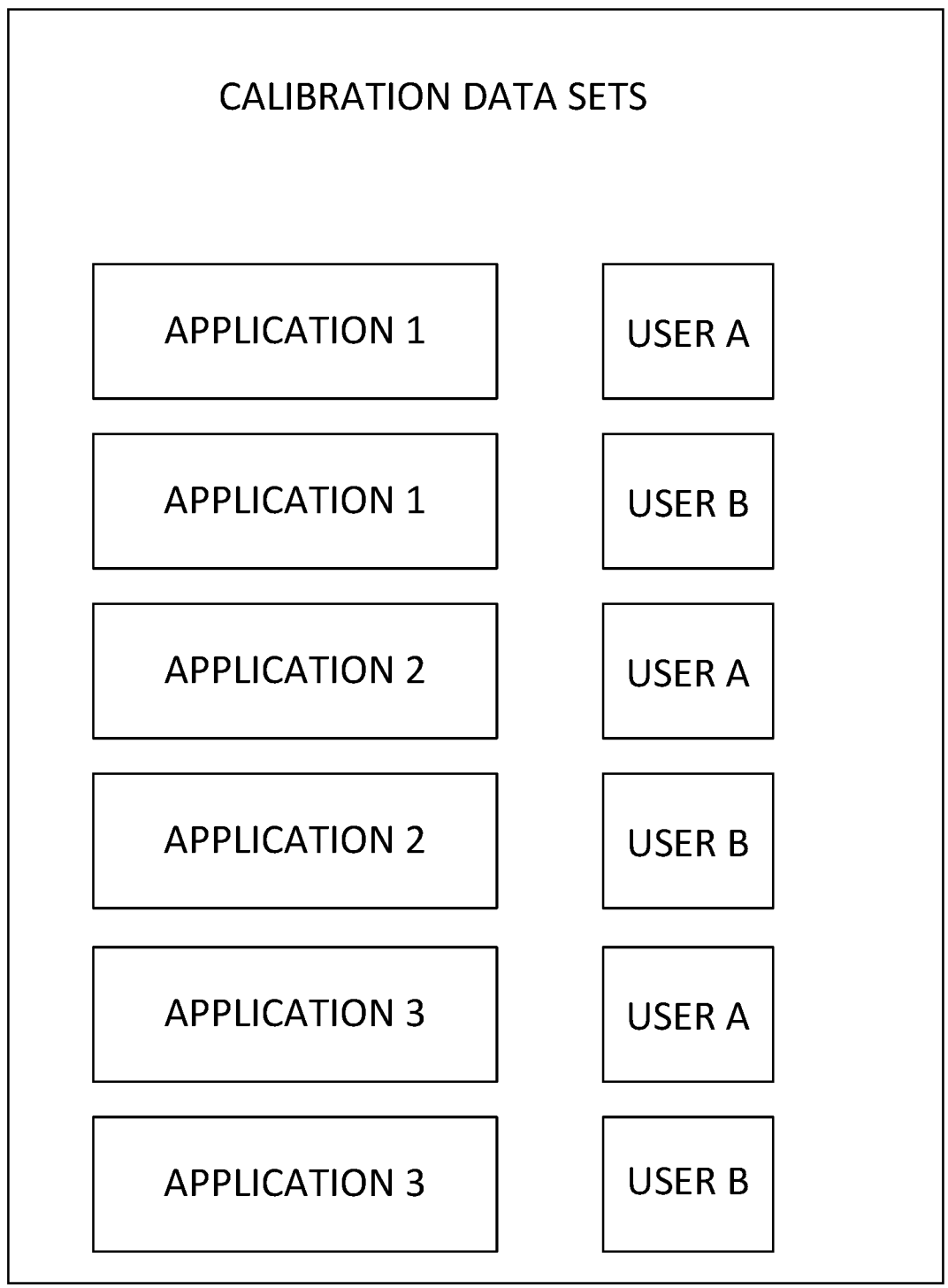
FIG. 11 illustrates selection of a calibration data sets.

Referring to FIG. 11, when a user is going to use the virtual reality headset, the user may select a particular application that the virtual reality headset is going to be used with and thereby select a calibration set particular to that application. In addition, each of the calibration sets may be customized for each particular user. In this manner, a different calibration set may be used for different applications. Also, in this manner, a different calibration set may be selected for the same application for different users.

In some embodiments, the headset may include a set of one or more external sensors affixed thereto, such as gyroscopic sensors, and the external sensors are used for calibration. Such calibration may include, for example, yaw, pitch, roll, and acceleration.

In some embodiments, the headset may be calibrated based upon other angular movements, such as 45 degrees, where movement of 45 degrees is translated into a movement of 90 degrees.

In a typical virtual reality game, the computer renders all the graphics for a 360 degree view, including those views behind the view of the user, where the headset only displays a small portion of the view at any particular time. As the head of the viewer turns it renders additional portions of the 360 degree view, which reduces the latency when the user's head turns. In contrast, the computer for a computer game it renders only that portion that is intended to be viewed on the display at any particular point in time. Since the computer for a computer game (or otherwise) only renders that portion that is intended to be viewed at any particular point in time, the visible resolution is suitable to be much greater than the rendering associated with a traditional 360 degree virtual reality.

In a typical embodiment, the video frame that the headset receives is in a polar coordinate system suitable to wrap a 360 degree space into a rectangular frame. In this manner, the headset needs to convert its view that is going to be rendered to normal rectangular coordinates for the headset screen, requiring significant computational resources. However, when the headset receives video content that is to be rendered which is already in normal rectangular coordinates, such as three-dimensional video from the converter, the computational requirements are simplified since the polar conversion is no longer necessary.

As it may be observed, when general typical video is captured and provided in a series of linear frames of reference, such as in X-Y coordinates, which is what is viewed on a monitor or movie screen. The computer then converts the linear frames of reference to a different coordinate system, such as a polar coordinate system, suitable to wrap a 360 degree space into a rectangular frame. Then a fraction of the polar coordinate space based frame of video content is then provided for display on a virtual reality headset display, such as 90 degrees vertical and 90 degrees horizontal, depending on the view that is selected. The 90 degrees vertical and 90 degrees horizontal may be extracted from the linear view, which tends to have relatively lower distortion, or may be computed based upon the polar view frame, which tends to have relatively higher distortion. The 90 degrees vertical and 90 degrees horizontal is generally $\frac{1}{8}^{th}$ of a frame that is observed. With the three-dimensional display, half of the $\frac{1}{8}^{th}$ is provided for the left eye and half of the $\frac{1}{8}^{th}$ is provided for the right eye, resulting in rendering $\frac{1}{16}^{th}$ for each eye. In this manner, the resolution provided to each eye is generally about standard definition which is relatively low-resolution. Unfortunately, for a virtual reality game it is necessary to render the entire 360 degree space for each frame, which is computationally expensive and slows down the speed at which the virtual reality game renders, which could inhibit the user's experience.

In contrast, it is more desirable to receive the general typical video that is captured and provided in a series of linear frames of reference, such as in X-Y coordinates, and omit the conversion of the series of linear frames of reference to another coordinate system, such as the polar coordinate system. The series of linear frames of reference may be converted to 3D and directly provided to the virtual reality headset, either at full resolution or at a reduced resolution. The virtual reality headset may receive the series of linear frames of reference and may include internal processing to convert the two-dimensional frames into three-dimensional frames. A control signal may be provided from the user or otherwise the virtual reality headset or otherwise a computing device associated with the virtual reality headset, to indicate to the computing device providing the series of linear frames of reference which frames of reference to provide. The control signal is preferably provided in the form of a human interface device (HID) based signal. In this manner, it is not necessary to render the entire 360 degree space for each frame, which is computationally expensive and slows down the speed at which the virtual reality game renders, which could inhibit the user's experience, and thereby improve the user's experience and reduce the computational expense of the system. Thus, this enables high-resolution virtual reality pixel detail that was not otherwise readily obtainable.

The embodiments described facilitate the use of the vast library of existing two-dimensional content and gaming content to be used in an expanded manner. Further, the full resolution of the series of linear frames may be used for the conversion from two-dimensional image content to three-dimensional image content. Also, by using the series of linear two-dimensional frames, the converted two-dimensional image content to three-dimensional image content tends to have an improved three-dimensional visual appearance, with up to generally 32 times more pixel detail with 4K UHD virtual reality headsets (depending on the relative resolutions) than the typical three-dimensional output from a software program operating on the computing device to a virtual reality headset. Moreover, by making direct use of the two-dimensional content, and the tools used in creating games based upon two-dimensional content, three-dimensional content may be derived in a simplified manner which extends the user experience of the game.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method for conversion of a series of two-dimensional images into a series of three-dimensional images comprising:
   (a) receiving said two-dimensional images from a video source through a flexible cable at a two-dimensional to three-dimensional converter where each of said series of two-dimensional images are from a same viewpoint, where said series of two-dimensional images do not include any images from a viewpoint other than said same viewpoint, where said two-dimensional images are received in a format suitable for being displayed on a two-dimensional display that is not capable of displaying three-dimensional video, where said two-dimensional images are received at a frame rate consistent with being displayed on said two-dimensional display;
   (b) said two-dimensional to three-dimensional converter processing said two-dimensional images all of which are from said same viewpoint and do not include any images from a viewpoint other than said same viewpoint to determine said three-dimensional images;
   (c) said two-dimensional to three-dimensional converter providing said three-dimensional images in a format suitable for being displayed on a three-dimensional display which is included as part of a head mounted display, where said three-dimensional images are provided at a frame rate consistent with being displayed on said three-dimensional display;
   (d) receiving said three-dimensional images by said three-dimensional display and in response rendering said three-dimensional images on said three-dimensional display, where a total view illustrated in said two-dimensional images is within 10 percent of the total view of said three-dimensional images when displayed on said three-dimensional display as part of said head mounted display.

2. The method of claim 1 wherein said said two-dimensional images are received by said two-dimensional to three-dimensional converter at a first bandwidth rate and wherein said three-dimensional images are provided by said two-dimensional to three-dimensional converter at a second bandwidth rate, wherein said second bandwidth rate at least one of is greater than and equal to said first bandwidth rate.

3. The method of claim 1 wherein said said two-dimensional images are received by said two-dimensional to three-dimensional converter at a first bandwidth rate and wherein said three-dimensional images are provided by said two-dimensional to three-dimensional converter at a second bandwidth rate, wherein said second bandwidth rate is the same as said first bandwidth rate.

4. The method of claim 1 wherein said video source is not aware that said two-dimensional images are to be displayed on said three-dimensional display.

5. The method of claim 4 wherein said three-dimensional display is not aware that said three-dimensional images originated as said two-dimensional images.

6. The method of claim 1 wherein said two-dimensional images are suitable to rendered with a maximum first view and said three-dimensional images are suitable to be rendered with a maximum second view that are different based upon pixel displacements.

7. The method of claim 1 wherein said three-dimensional display is a three-dimensional enabled virtual reality headset.

8. The method of claim 7 wherein said three-dimensional display includes at least one sensor for tracking motion of said three-dimensional display.

9. The method of claim 8 wherein said at least one sensor includes at least one of a gyroscope, an accelerometer, and a position tracker.

10. The method of claim 8 wherein said three-dimensional display provides an motion signal that is received by said video source.

11. The method of claim 10 wherein said video source modifies said two-dimensional video based upon receiving said motion signal.

12. The method of claim 11 wherein said motion signal is provided to said video source through said two-dimensional to three-dimensional converter.

13. The method of claim 11 wherein said motion signal is at least one of received by and converted to said video source as a human interface device.

14. The method of claim 13 wherein said human interface device is bound in a manner based upon a particular context being used.

15. The method of claim 14 wherein said context is a computer mouse.

16. The method of claim 14 wherein said context is a keyboard.

17. The method of claim 14 wherein said binding includes scaling factors.

18. The method of claim 14 wherein said binding is based upon an interactive process.

19. The method of claim 14 wherein said binding is based upon a selection of one of a plurality of calibration sets.

20. The method of claim 14 wherein said context is a game controller.

* * * * *